(12) United States Patent
Harmon

(10) Patent No.: US 12,158,629 B1
(45) Date of Patent: Dec. 3, 2024

(54) CABLE CLAMP

(71) Applicant: Christopher Thomas Harmon, Webster, MA (US)

(72) Inventor: Christopher Thomas Harmon, Webster, MA (US)

( * ) Notice: Subject to any disclaimer, the term of this patent is extended or adjusted under 35 U.S.C. 154(b) by 56 days.

(21) Appl. No.: 17/889,841

(22) Filed: Aug. 17, 2022

Related U.S. Application Data

(60) Provisional application No. 63/239,593, filed on Sep. 1, 2021.

(51) Int. Cl.
*G02B 6/44* (2006.01)
*G02B 6/46* (2006.01)

(52) U.S. Cl.
CPC .......... *G02B 6/4471* (2013.01); *G02B 6/46* (2013.01)

(58) Field of Classification Search
CPC ....................................................... G02B 6/46
See application file for complete search history.

(56) References Cited

FOREIGN PATENT DOCUMENTS

| CN | 101598247 A | * | 12/2009 |
| CN | 211193583 U | * | 8/2020 |
| CN | 212519732 U | * | 2/2021 |
| CN | 213661074 U | * | 7/2021 |

OTHER PUBLICATIONS

English translation of CN213661074U (Year: 2021).*
English translation of CN212519732U (Year: 2021).*
English abstract of CN211193583U (Year: 2020).*
English translation of CN-101598247-A (Year: 2009).*

* cited by examiner

Primary Examiner — Sung H Pak
(74) Attorney, Agent, or Firm — RAGGIO & DINNIN, P.C.

(57) ABSTRACT

A cable clamp for use with telecommunication cables. The cable clamp is a one piece design comprising a top plate and a bottom plate connected to each other by a hinge. The cable clamp also comprises a closing mechanism arranged on one end thereof and operable by one hand. The top plate includes a gasket arranged on an inner surface thereof. The bottom plate includes a first and second gasket arranged on a top surface thereof. The cables are in contact with the gaskets from both plates, thus securing them in a predetermined position for prepping and splicing.

19 Claims, 6 Drawing Sheets

CABLE CLAMP

This application claims the benefit of U.S. Provisional Patent Application No. 63/239,593—Filed: Sep. 1, 2021

BACKGROUND OF THE INVENTION

1. Field of the Invention

The present invention generally relates to clamps, and more particularly relates to a clamp for use with telecommunication fiber optic cables, copper cables or other such cables used in like industries.

2. Description of Related Art

Clamps have been known in the art for many years. In particular, the cable clamps used in telecommunication settings for fiber optic cables, copper cables or the like are used to hold the cables in a predetermined position so that the cables may be cleaned, spliced, or worked on without the cables shifting. Cable clamps of the prior art may have been designed to create a simple way to secure cables into the back of a splicing lab, a fiber optic trailer, a work truck or portable work station within a work space or any other area where the user may need to hold cables in a predetermined position. It should be noted that the clamps of the prior art generally were made of a very light weight sheet metal.

Many of these prior art cable clamps were hard to use and would fall apart quickly. Another problem with these prior art cable clamps was that many of them required hand tools and wrenches to adjust to specific size cables being used therewith. In fact, some of the prior art cable clamps would need to have a top portion completely removed in order to place cables therein, thus creating more work for the technician using such clamps.

Therefore, there is a need in the art for an improved cable clamp. There also is a need in the art for an improved cable clamp that is made of steel, as opposed to other lightweight materials. Furthermore, there is also a need in the art for a cable clamp that is one piece with a hinge incorporated into a top and bottom plate of the cable clamp, which allows for one handed operation of the clamp. There also is a need in the art for a cable clamp that is built to last and is made of quality materials that will not fall apart and is able to accommodate many different cable sizes at the same time and is capable of being operated by one hand of the person working on the cables.

SUMMARY OF THE INVENTION

One object of the present invention may be to provide a novel and unique cable clamp.

Another object of the present invention may be to provide a cable clamp that has a top plate and a bottom plate wherein a hinge is incorporated into each of the plates of the cable clamp.

Still another object of the present invention may be to provide a cable clamp that is made of steel as opposed to other lightweight metals and is capable of being operated by one hand of the cable clamp user.

Yet another object of the present invention may be to provide a cable clamp that is compatible with any size diameter cables without specific adjustments to the clamping surfaces.

Another object of the present invention may be to provide a cable clamp that is easy to manufacture, easy to use, more robust and longer lasting than the cable clamps of the prior art.

According to the present invention, the foregoing and other objects and advantages are obtained by a novel design for a cable clamp. The cable clamp is generally designed and used with telecommunication fiber optic cables, copper cables or any other such cables found in the telecommunication and related fields. The cable clamp is a one piece design comprising a top plate and a bottom plate having a hinge welded on the left side of both plates to act as a pivot point to open and close the clamp to a predetermined angle. The cable clamp has a closing mechanism arranged on one end thereof and the closing mechanism is operable by one hand. The top plate of the cable clamp, on an inner surface thereof, includes a rubber gasket generally arranged at a mid point thereof. The bottom plate of the cable clamp generally includes a first and second rubber gasket arranged on a top surface thereof, wherein the rubber gaskets are parallel to one another with a predetermined space or gap therebetween. The cable clamp has a first and second flange extending from the bottom plate, which enables the user of the cable clamp to secure the clamp onto a surface, such as a work station, portable table, fiber optic lab splicing counter or any other flat surface. This may allow for the cable clamp to be secured in one position relative to a work space and allow for cables of various diameters and sizes to be arranged between the top plate and bottom plate and then secured therebetween. The cables are in contact with the gasket of the top plate and the two gaskets of the bottom plate, thus securing and holding the cables for prepping into enclosures and also splicing the cables.

One advantage of the present invention may be that it provides a novel and unique cable clamp.

Another advantage of the present invention may be that it provides for a cable clamp that is a one piece design composing a top plate and a bottom plate with a hinge welded on both of those plates on the left side thereof.

Still another advantage of the present invention may be that it provides a cable clamp that is constructed of a forged solid steel material.

Yet another advantage of the present invention may be that it provides for a cable clamp that uses a closing mechanism arranged on one end of the clamp, which allows for one handed operation of the clamp by the user thereof.

Still another advantage of the present invention may be that it provides a cable clamp that has flanges incorporated into the bottom plate thereof to allow for the cable clamp to be secured to a work station, a portable table, etc.

Yet another advantage of the present invention may be that it provides a cable clamp that has a gasket, wherein two gaskets are arranged on a bottom plate and one gasket is arranged on the top plate, to help secure and hold the cables therebetween when the cables are being worked on.

Yet another advantage of the present invention may be that it provides a cable clamp that is easy to manufacture, easy to use and may last many years over those of the prior art.

Other objects, features and advantages of the present invention will become apparent from the subsequent description, and appended claims taken in conjunction with the accompanying drawings.

DESCRIPTION OF THE EMBODIMENT(S)

Figure 1:
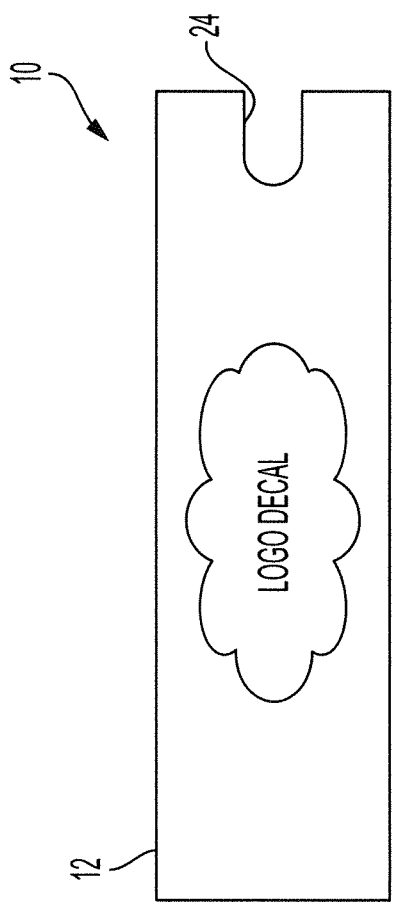
FIG. 1 shows a top view of the cable clamp according to the present invention.
Figure 2:
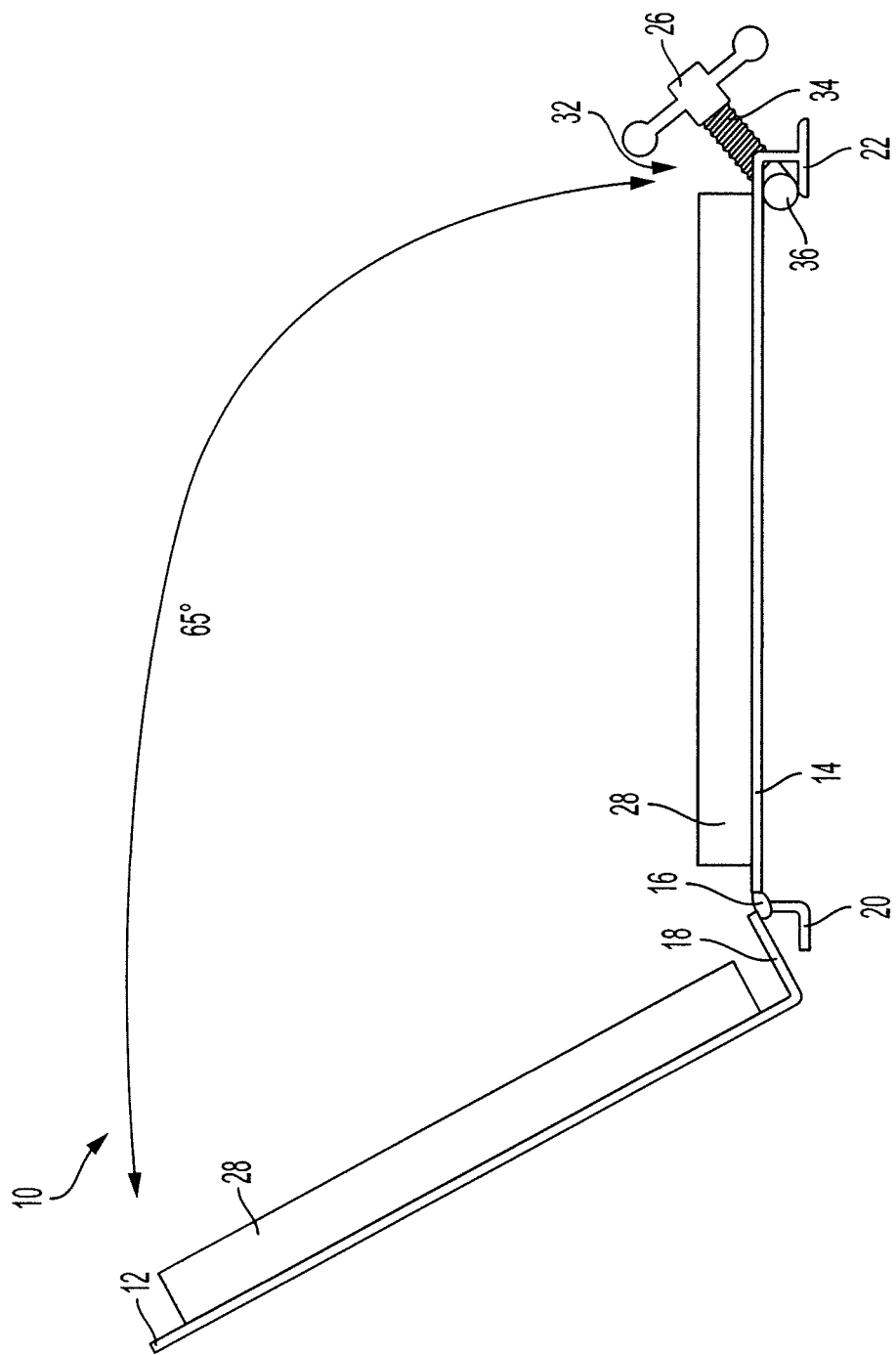
FIG. 2 shows a side view of the cable clamp in an open position according to the present invention.
Figure 3:
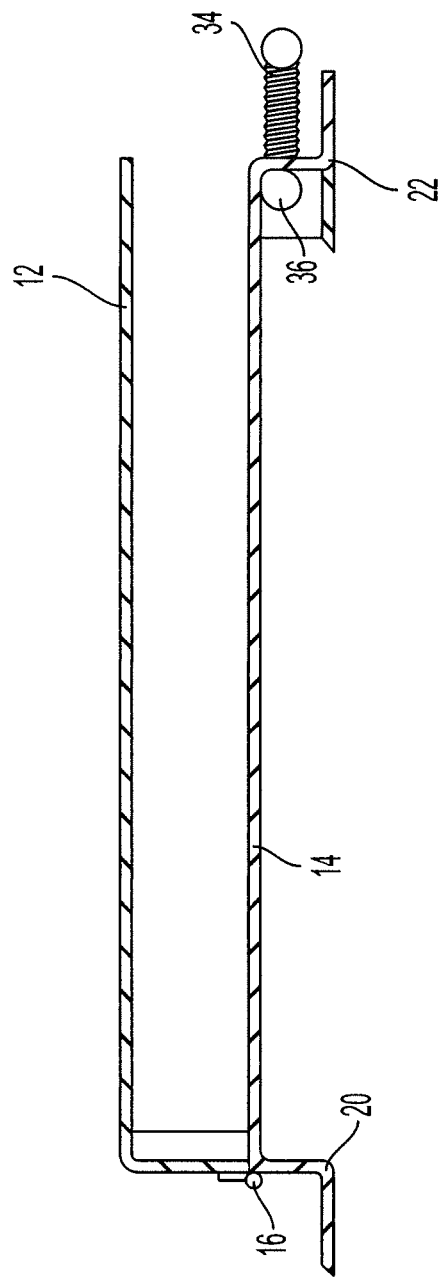
FIG. 3 shows a side view of the cable clamp.
Figure 4:
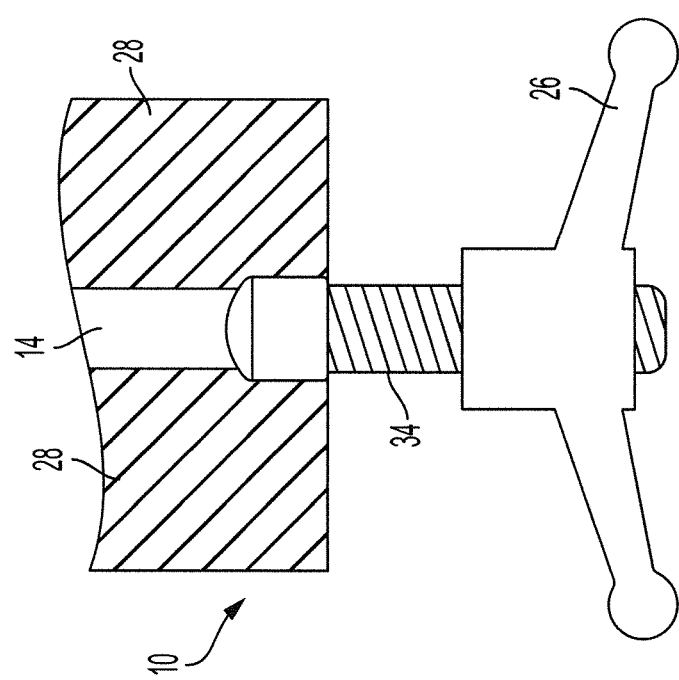
FIG. 4 shows a top view of the bull nut and threaded rod of the cable clamp according to the present invention.
Figure 5:
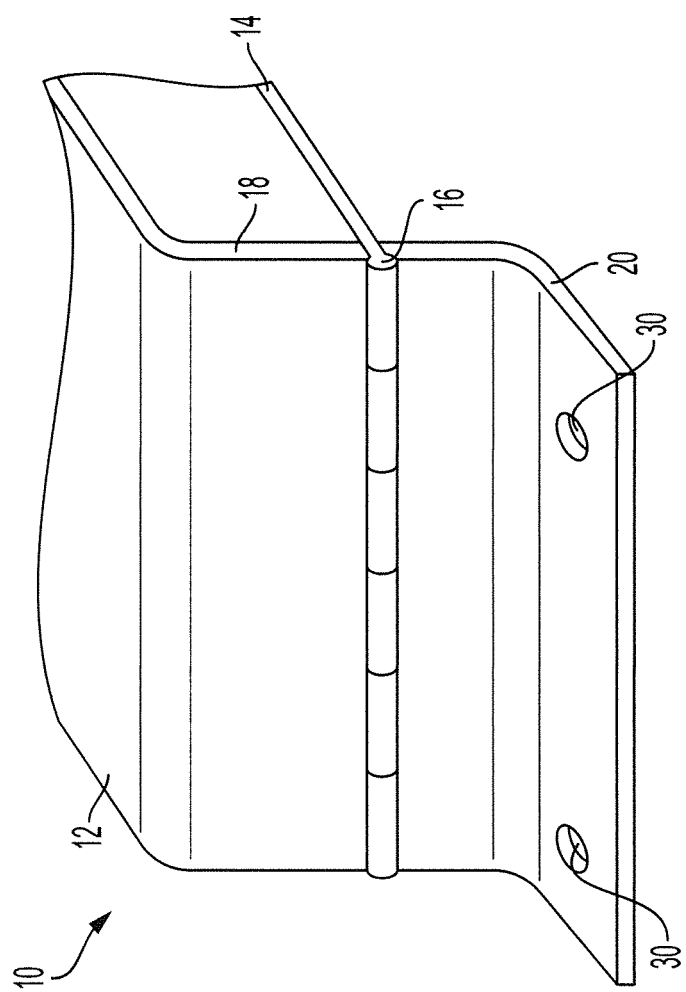
FIG. 5 shows a back view of the cable clamp in its closed position according to the present invention.
Figure 6:
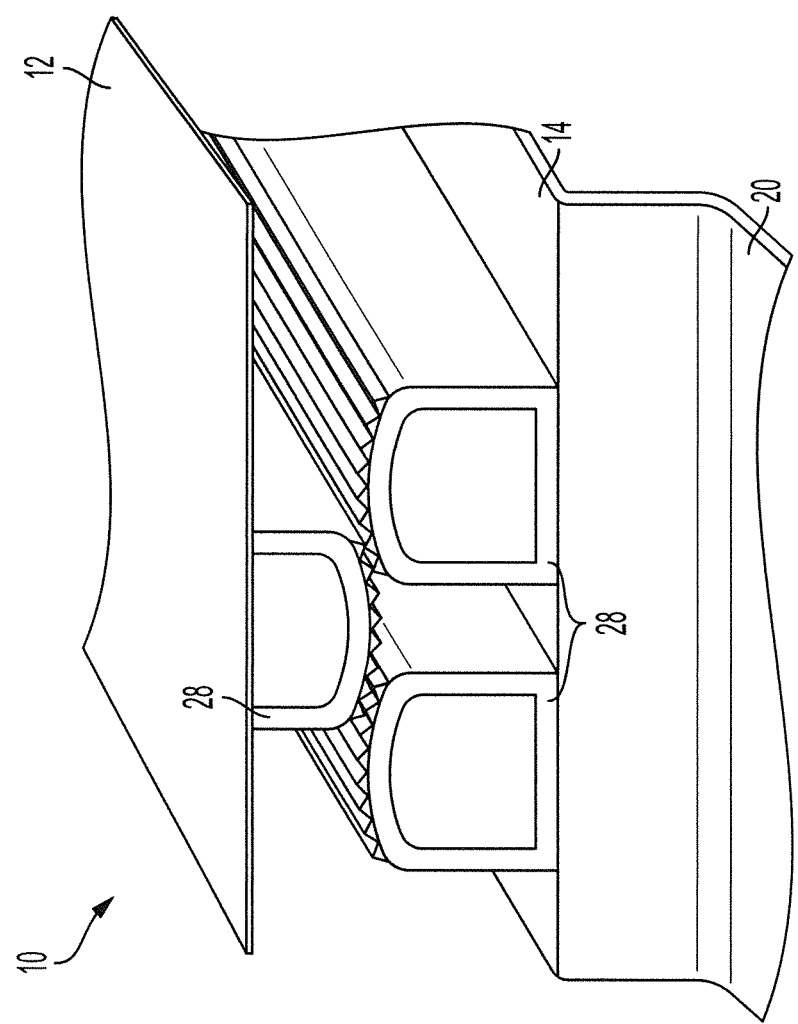
FIG. 6 shows an end view of the cable clamp according to the present invention.

Referring to the drawings, a clamp or cable clamp 10 for use while working in the telecommunication industry specifically for use on telecommunication fiber optic cables, copper cables or any other such cables. It should be noted that the cable clamp 10 may be used on any type of cable, wire, rod, tube, or in any other industry other than telecommunications. The cable clamp 10 is designed to hold cables with diameters as large as approximately three and a half inches and as small as approximately one quarter of an inch. However, it should be noted that the cable clamp 10 may be made larger or smaller to allow for the holding of cables with diameters as small as approximately one thirty second of an inch up to approximately twelve inches depending on the design requirements and the environment in which the cable clamp 10 may be used. Generally, the cable clamp 10 of the present invention may give the user a simple way to secure cables into the back of a splicing lab, a fiber optic trailer, a work truck or portable work station within that work space or any other area where the user finds the clamp 10 is needed to hold cables, wires, etc. The cable clamp 10 of the present invention may create a secure environment for prepping the cables of the telecommunications industry in their enclosures, and also splicing the cables. Furthermore, when the cable clamp 10 of the present invention is closed and tightened down, the cables arranged therein may not get yanked out, pulled out or have any movement thereon, because once placed within the cable clamp 10 of the present invention and tightened via the closure mechanism, the cables may be fixed in one position. The cable clamp 10 of the present invention is different from many of those in the prior art because it may be operated and utilized with one hand and requires no tools to adjust the cable clamp 10 or the size of the cables which are to be held within the cable clamp 10. The cable clamp 10 of the present invention is robust and made with high quality materials, which may allow for years of harsh abuse and may stand up to many years of use in the environment.

The cable clamp 10 of the present invention is generally a one piece design including a top plate 12 and a bottom plate 14. Arranged at a left side of the top plate 12 and the bottom plate 14 is a hinge 16 which is welded onto both the top plate 12 and the bottom plate 14 and acts as a pivot point to open and close the cable clamp 10 to a predetermined angle. In one contemplated embodiment, the cable clamp 10 may open to as much as a one hundred sixty five degree angle. However, it should be noted that the cable clamp 10 may be designed to open to angles greater than one hundred sixty five degrees or less than one hundred sixty five degrees depending on the design requirements. Generally, the top plate 12 of the cable clamp 10 has a rectangular shaped body with a flange 18 extending at a generally ninety degree angle from one end thereof. It should be noted that any other design shape, other than rectangular may be used for the clamp 10. Arranged at the bottom of the flange 18 of the top plate 12 and welded thereon is one portion of the hinge 16.

It should be noted that generally the top plate 12 and the bottom plate 14 of the cable clamp 10 of the present invention is constructed of three sixteenth inch forged solid steel. However, it should be noted that any other type of metal, ceramic, plastic, composite, natural material or man made material may also be used to form the top plate 12 and bottom plate 14 of the cable clamp 10 according to the present invention. The bottom plate 14 also has a rectangular shaped body with an L-shaped flange 20 extending from one end thereof and a T-shaped flange 22 extending from another end thereof. The hinge 16 portion of the cable clamp 10 is connected on an end of the bottom plate 14 arranged near the L-shaped flange 20. This hinge 16 interacts with the hinge portion welded on the top plate 12. This interconnection allows for rotation between the bottom plate 14 and the top plate 12 at the hinge 16 arranged thereon. In one contemplated embodiment, the hinge 16 may have alternating circular channels with a pin or rod arranged through the circular channels to secure the top plate 12 to the bottom plate 14 and allow for rotation of the clamp plates with the hinge 16 acting as the pivot point between the bottom plate 14 and the top plate 12. Therefore, with the hinge 16 arranged at the bottom portion of the flange 18 of the top plate 12 and at the top portion of the L-shaped flange 20 of the bottom plate 14 this may allow for the approximate one hundred sixty five degree opening of the cable clamp 10 when in its fully open position. It should be noted that generally the hinge 16 is secured to the flange 18 of the top plate 12 via a welding operation, however any other known mechanical or chemical fastening technique may be used to secure the one portion of the hinge 16 to the top plate 12 or bottom plate 14 other than welding.

It should be noted that the top plate 12 of the cable clamp 10 also may include a notch 24 arranged in an end of the body of the top plate 12. This notch 24 generally may have a U-shape as shown in the figures. The notch 24 is generally arranged at a mid point of the width of the top plate 12 of the clamp 10 and extends a predetermined distance into the body of the cable clamp 10. This notch or cutout 24 may allow for a bull nut 26 or other closing mechanism to be arranged therewith, thus allowing for securing of the top plate 12 of the cable clamp 10 to the bottom plate 14 of the cable clamp 10 when cables are arranged therebetween. It should be noted that any other shape or sized cutout or notch 24 may be used in the top plate 12. It should further be noted that in one contemplated embodiment the length of the top plate 12 may be approximately thirteen and three eighth inches while the width may be approximately three and one quarter inches. Generally, the cutout 24 may extend approximately one inch into the body of the top plate 12 and may have a width of approximately one half inch. Furthermore, the flange 16 extending from one end of the top plate 12 may extend approximately one and five eighth inches. However, it should be noted that any other dimension may be used for the clamp 10 other than those described above, such that any size clamp 10 may be designed and built with different specifications. It is contemplated that the dimensions therein may range anywhere from approximately one thirty second of an inch up to approximately forty eight inches in some contemplated embodiments.

The top plate 12 of the cable clamp 10 also may have a gasket or seal 28 arranged on an inner surface thereof. In one contemplated embodiment, the gasket 28 may be a rubberized material that has one gasket 28 arranged generally along a mid point and along the entire length of the top plate 12 on an inner surface thereof. The rubberized gasket 28 may have a predetermined length, width and depth. The rubberized gasket 28 length may generally be the same as that of the body of the top plate 12 or may be slightly less than or greater than the length of the top plate 12 while the width of the gasket 28 may be approximately one inch and the depth of the gasket 28 may be approximately one inch. However, it should be noted that any other size gasket 28 may be used depending on the design requirements and environment in which the cable clamp 10 may be used. It is also contemplated that the gasket 28 may be hollow or solid. The gasket 28 may have a generally square cross section in one embodiment. In another embodiment, the gasket 28 may have a generally square cross section, but with a slight curve in the top portion thereof. The shape of the gasket 28 may allow for the gasket 28 to compress and conform around a cable that is arranged therebetween. In one contemplated embodiment, the top surface of the gasket 28 may have a plurality of ridges running the entire length thereof, thus giving better grip and holding power to the cable against the gasket 28. It should further be noted that in the embodiment shown in the drawings, a single gasket 28 is arranged along and generally at a mid point or center point along the length of the top plate 12. It should be noted that multiple gaskets of varying sizes may also be arranged on the top plate 12 according to the present invention. It should further be noted that the gasket 28 may not extend into the cutout 24 of the top plate 12, thus allowing for the closure mechanism to operate properly to hold the clamp 10 in its closed position.

The bottom plate 14 generally has the same dimensions as that of the top plate 12. The bottom plate 14 also may include at least one orifice 30 arranged through the L-shaped flange 20. The orifice 30 generally may have a circular shape and may allow for a screw, dowel, pin or bolt to be arranged therethrough for attaching the bottom plate 14 of the clamp 10 to a work station, work table, etc. It should be noted that it is also contemplated that a second orifice 30 is also arranged through a surface of the L-shaped flange 20 in order to offer two secure points to the surface to which the bottom plate 14 of the clamp 10 is secured. It should further be noted that any other shaped orifice other than a circular orifice may also be used and any other fastener, other than a screw, may be used to attach the bottom plate 14 of the cable clamp 10 to the work surface. Furthermore, more than two orifices 30 may also be arranged therethrough depending on the design requirements of the cable clamp 10. It is also contemplated that at least one or may be more orifices 30 are arranged through a surface of the T-flange 22 of the bottom plate 14 of the cable clamp 10, such that fasteners such as screws may be used on both sides of the bottom plate 14 of the clamp 10 to ensure the cable clamp 10 is securely held in a predetermined position. In the embodiment shown, a first and second orifice 30 are also arranged through a surface of the T-shaped flange 22 in order to secure the bottom plate 14 to the surface on which the clamp 10 is being used. In one contemplated embodiment shown in the drawings, a portion of the L-shaped flange 20 extending directly from the body of the bottom plate 14 has a length of approximately one and one eighth inch and the other portion of the L-shaped flange 20 has a length of approximately one inch. The length of the portion extending directly from the bottom plate 14 for the T-shaped flange 22 is approximately one and one eighth inches while the other portion of the T-shaped flange 22 is approximately two and three eighth inches long. However, it should be noted that any other size may be used for the L-shaped flange 22 and the T-shaped flange 22 of the bottom plate 14. The bottom plate 14 may also include at least one gasket 28 arranged on a top surface thereof. In the embodiment shown, a first and second gasket 28 is secured to a top surface of the bottom plate 14 along the entire length thereof. The dimensions of the gasket 28 are the same as those described above for the top plate 12. In the embodiment shown, the first and second gasket 28 are arranged parallel to one another and equal distance from a mid line thereof with a predetermined size gap therebetween. This may ensure that when the top plate 12 and the bottom plate 14 are in a closed position a predetermined area of the first gasket 28 of the bottom plate 14 may interengage and contact with a predetermined outside area of the top gasket 28 arranged on the top plate 12, while the same occurs for the second gasket 28 on another outside area of the top gasket 28. Thus, when the bottom plate 14 and the top plate 12 are put into a closed position the gasket 28 of the top plate 12 may interact with both the first and second gasket 28 of the bottom plate 14 in a predetermined manner such that any cables arranged therebetween may be secured and may not move during work thereon. It should be noted that the bottom plate gaskets 28 are similar to the top plate gasket 28 as they are hollow and may have a generally curved top portion with a plurality of ridges arranged along the entire length thereof. The gaskets 28 are both flexible and pliable which allow for a secure grip to be placed on the cables when the cables are arranged therebetween. It should be noted that the gaskets 28 are generally made of a rubber material, however any other rubber, plastic, composite or natural material may be used as long it is flexible, pliable and capable of holding a cable in a predetermined position. The use of the hollow gaskets 28 on both the top plate 12 and bottom plate 14 of the cable clamp 10 may allow for a variety of sizes of cables to be held and secured therein. In one contemplated embodiment, cables ranging in diameters from approximately three and one half inches to approximately one quarter inch may be held and secured firmly within the cable clamp 10 and the gaskets 28 arranged thereon. It should be noted that any other size of cable may also be held between the top plate 12 and bottom plate 14 depending on the design requirements of the cable clamp 10 and the associated gaskets 28. It should be noted that both the top plate and bottom plate gaskets 28 generally are adhered to the top plate 12 and the bottom plate 14 with an adhesive material that is designed to withstand the harsh chemicals used when cleaning fiber optic cables. However, it should be noted that any other mechanical or chemical fastening technique, other than adhesives may be used, such as but not limited to tacks, screws, nails, hook and loop fasteners, glue, etc. Therefore, when the cable clamp 10 is closed the rubber gaskets 28, which are adhered and secured firmly to the top and bottom plate 12,14 may grip and squeeze the cables arranged therein without damaging the fiber optic cable or pinching the cable, thus allowing for a very tight and solid grip on the cable which allows no slippage once the clamp 10 is tightened into its closed position. It should further be noted that the gasket 28 material is designed to withstand chemicals used in the prepping of the cables.

The cable clamp 10 of the present invention includes a closing mechanism 32. The closing mechanism 32 is generally arranged within a space defined by the T-shaped flange 22 and a bottom surface of the bottom plate 14. In one contemplated embodiment, a threaded rod 34 is attached to a rod 36 having a threaded orifice therein. The rod 36 is incorporated into a space underneath the bottom plate 14 of the cable clamp 10 which may allow for the threaded rod 34 to pivot without restriction into and out of the notch 24 of the top plate 12. It should be noted that the T-shaped flange 22 also may have a notch or cutout arranged therein, which allows for the threaded rod 34 to rotate therein thus allowing it to come into contact with the notch 24 of the top plate 12. The rod 36, which is arranged in the space below the bottom plate 14 and within one portion of the T-shaped flange 22, generally extends the width of the bottom plate 14 or slightly less than the width of the bottom plate 14. The rod 36 rotates with the threaded rod 34, wherein the threaded rod 34 maybe located within the cutout or notch 24 of the top plate 12 in a closed position. It should be noted that it is contemplated that the rod 36 may be arranged in a predetermined holding system on a bottom surface of the body of the bottom plate 14, such that it rotates within that holder system in order to allow the threaded rod 34 to pivot between its closed position and its open position. Arranged on a top end of the threaded rod 34 may be a bull nut 26. The bull nut 26 may be closed and opened with one hand, thus allowing for closing and opening of the clamp 10 with one hand. It should be noted that any other type of nut, other than a bull nut 26, may be used, such as a wing nut, regular nut or any other fastening mechanism that works with threaded rods 34. Therefore, one end of the threaded rod 34 has a bull nut 26 arranged thereon, wherein the opposite end of the threaded rod 34 is threaded into the rod 36. Therefore, the rod 36 which is arranged and pivots in a bottom area of the bottom plate 14 of the clamp 10, may allow for rotation of the threaded rod 34 between its closed position, wherein it is in the notch or cutout 24 of the top plate 12 and its open position where it is generally parallel to the body of the top plate 12. It should be noted that when the bull nut 26 is turned in a clockwise direction it may tighten and engage with a top surface of the top plate 12, thus squeezing the top plate 12 towards the bottom plate 14 and the gasket 28 of the top plate 12 into the two gaskets 28 of the bottom plate 14, thus securing any cables which may be placed therebetween in a predetermined position while work occurs thereon. It should be noted that threaded rod 34 may be used alone with bull not 26. In this contemplated embodiment, threaded rod 34 has a flange on one end thereof which allows the threaded rod 34 to pivot with respect to bottom plate 14 and to be secured to the bottom plate 14. It should be noted that all of the components described herein other than the gaskets 28 are generally made of a robust and forged steel material, however any other material, such as but not limited to any other metal, composite, ceramic, plastic, natural material, or manmade material may also be used. It should be noted that it is also contemplated that threaded rod 34 may have a T-shape, wherein rod 36 is not needed.

In operation, the cable clamp 10 of the present invention is designed for a one man operation. Generally, the person using the clamp 10 may first secure the clamp 10 via fasteners through the flanges 28 of the bottom plate 14 to the work surface being worked on. Then the clamp 10 may be put in an open position, wherein the top plate 12 is rotated away from the bottom plate 14. Next the cables being worked on would be laid into the clamp 10 such that they are resting on the gaskets 28 of the bottom plate 14 and then the user would rotate or flip the top plate 12, such that the gasket 28 therein comes into contact with the cables arranged on the gaskets 28 of the bottom plate 14. Then the top plate 12 of the clamp 10 would be urged or moved in a downward direction by rotating the closure mechanism 32 featuring the threaded rod 34 and the bull nut 26 up into the cutout or groove of the top plate 12. Next, the user would rotate the bull nut 26 in a clockwise direction to tighten down or move the top plate 12 towards the bottom plate 14 to achieve maximum grip of and secure the predetermined position of the cables therebetween. Thus, rubber gaskets 28 may tighten around and collapse a predetermined amount around the cables to ensure the cables are secured in a predetermined position. It should further be noted that the cable clamp 10 of the present invention may also have powdered coating on the outer surface and inner surface thereof to protect the steel and to create a professional looking product that is aesthetically pleasing. Furthermore, one advantage of this cable clamp 10 from the prior art is that you can operate it with one hand and it requires no tools to adjust. The cables are just laid on the surface of the gaskets 28 arranged on the bottom plate 14 and then the top plate 12 is rotated over and tightened thereon. Therefore, with the plates 12,14 generally being made of a solid steel and having an incorporated hinge 16, the cable clamps 10 may never require any replacement and may not fall apart. Furthermore, the bull nut 26, which is used to tighten the cable clamp 10 and open the cable clamp 10, is completely incorporated into the bottom plate 14, such that the bull nut 26 and associated threaded rod 34 may not fall off the clamp 10 during usage thereof, thus allowing for years of harsh abuse that may stand up to many years of use. The clamp 10 of the present invention has many advantages over the prior art. The present invention may allow the user to place any size cables in the cable clamp 10 in any position without any adjustment necessary. Many of the prior art cable clamps require hand tools and wrenches to adjust to a specific size and diameter of cable that is being held therein. The present invention is also a one piece cable clamp with the closure arranged therein, wherein the hinge 16 is incorporated into the top and bottom plate 12,14 of the cable clamp 10. Many of the prior art cable clamps need to have the top completely removed in order to have cables arranged therein. The present invention cable clamp 10 is designed and built to last, is made of high quality materials that may not fall apart and is capable of fitting many different size and diameter cables while also allowing for one handed operation by the user of the cable clamp 10 in the work environment.

This description is for illustrative purposes only and it should not be construed to limit the present invention in any way. Thus, a person skilled in the art will appreciate that various modifications might be made to the present and disclosed embodiments without departing from the scope and spirit of the present invention, which is defined in terms of the claims below. Other aspects, features and advantages may be apparent upon an examination of the attached drawing figures and appended claims.

What is claimed is:

1. A cable clamp for temporarily holding a telecommunication cable, said clamp comprising:
    a first plate having at least one orifice arranged entirely through a surface thereof, said orifice receives a fastener therethrough;
    a second plate pivotally connected to said first plate;
    a single closing member arranged at one end of the clamp;
    a first gasket generally arranged on and at a mid-point of said second plate;
    a second gasket arranged on said first plate; and
    a third gasket arranged on said first plate, said second gasket is parallel to said third gasket, said second and third gaskets are arranged on a top surface of said first plate, said second and third gaskets are equal distance from a mid-point of said first plate, said second and third gaskets having a predetermined size gap therebetween, said first gasket contacts said second gasket and said third gasket when the clamp is in a closed position.

2. The clamp of claim 1 further comprising a first and second flange extending from said first plate.

3. The clamp of claim 2 wherein said first flange is arranged at a first end of said first plate, said second flange is arranged at a second end of said first plate, said first flange having said at least one orifice arranged therethrough.

4. The clamp of claim 2 wherein said first flange having a generally L-shape, said second flange having a generally T-shape.

5. The clamp of claim 4 wherein said first plate having a hinge connected on a first end thereof, said hinge arranged near said generally L-shaped flange.

6. The clamp of claim 1 wherein said first plate and said second plate having a generally rectangular shape.

7. The clamp of claim 1 wherein said second plate having a flange arranged on a front end thereof.

8. The clamp of claim 7 wherein a hinge is connected to an end of said flange, said second plate rotates with respect to said first plate at said hinge.

9. The clamp of claim 7 wherein said second plate having a generally U-shaped notch arranged in a second end thereof.

10. The clamp of claim 1 wherein said first gasket is arranged on an inner surface of said second plate, said first gasket is arranged to align generally within a gap between said second and third gaskets when the clamp is in a closed position.

11. The clamp of claim 1 wherein said gaskets are generally made of rubber.

12. The clamp of claim 11 wherein said gaskets have a generally square shape cross section.

13. The clamp of claim 12 wherein said gaskets are hollow, said gaskets have a plurality of ridges along a top surface thereof.

14. The clamp of claim 1 wherein said closing member having a threaded rod and a bull nut, said threaded rod pivots with respect to said first plate, said bull nut contacts and engages a top surface of said second plate when said second plate is in a closed position.

15. The clamp of claim 4 wherein said second flange having a notch arranged therein, a threaded rod of one closing member pivots within said notch.

16. A method of holding telecommunication cables with a one handed operation cable clamp, said method comprising the steps of:
   securing the cable clamps to a work surface with fasteners;
   rotating a top plate of the cable clamp away from a bottom plate of the cable clamp, said top plate having a first gasket arranged on and at a mid-point thereof;
   laying the cables being worked with on a second and third gasket of said bottom plate, said second and third gaskets are arranged on a top surface of said bottom plate, said second and third gaskets are equal distance from a mid-point of said bottom plate, said second and third gaskets having a predetermined size gap therebetween, said first gasket contacts said second gasket and said third gasket when the clamp is in a closed position;
   rotating said top plate onto the cables via a hinge located on a short edge of the cable clamp;
   pivoting a closing member into contact with said top plate; and
   securing the cables in place via said closing member engaging said top plate towards said bottom plate.

17. The method of claim 16 wherein said bottom plate having an orifice therethrough for receiving at least one of said fasteners.

18. The method of claim 16 wherein the top plate having a notch arranged in an end thereof.

19. The method of claim 16 wherein closing member having a threaded rod that pivots with respect to said bottom plate, said closing member having a bull nut arranged on said threaded rod.

* * * * *